United States Patent [19]

Barnekov et al.

[11] Patent Number: 5,578,229
[45] Date of Patent: Nov. 26, 1996

[54] METHOD AND APPARATUS FOR CUTTING BOARDS USING OPPOSING CONVERGENT LASER BEAMS

[75] Inventors: Vladmir Barnekov, East Lansing; Henry A. Huber, DeWitt; Kalinath Mukherjee, Okemos, all of Mich.

[73] Assignee: Michigan State University, Lansing, Mich.

[21] Appl. No.: 325,671

[22] Filed: Oct. 18, 1994

[51] Int. Cl.⁶ .................................................. B23B 26/08
[52] U.S. Cl. .............................. 219/121.72; 219/121.67; 219/121.76; 219/121.84
[58] Field of Search ........................ 219/121.67, 121.72, 219/121.75, 121.76, 121.77, 121.84; 83/51

[56] References Cited

U.S. PATENT DOCUMENTS

| | | | |
|---|---|---|---|
| 3,610,871 | 10/1971 | Lumley | 219/121.76 |
| 3,679,863 | 7/1972 | Houldcroft et al. | 219/121.72 |
| 4,469,931 | 9/1984 | Macken . | |
| 4,491,463 | 1/1985 | Weinstein et al. . | |
| 4,625,093 | 11/1986 | Chryssolouris . | |
| 4,642,439 | 2/1987 | Miller et al. . | |
| 4,689,467 | 8/1987 | Inoue . | |
| 4,751,365 | 6/1988 | La Rocca et al. . | |
| 4,761,535 | 8/1988 | Lawson . | |
| 4,943,700 | 7/1990 | Hughes et al. . | |
| 5,108,669 | 4/1992 | Dijk et al. | 219/121.72 |
| 5,367,929 | 11/1994 | Burch et al. . | |
| 5,521,352 | 5/1996 | Lawson | 219/121.67 |

FOREIGN PATENT DOCUMENTS

| | | | |
|---|---|---|---|
| 59-30494 | 2/1984 | Japan | 219/121.77 |
| 59-212185 | 12/1984 | Japan | 219/121.72 |

OTHER PUBLICATIONS

Advanced Technology Applications to Eastern Hardwood Utilization—Excerpt: Advanced Wood Processing, Progress Report #5, 1992, Dept. of Forestry Michigan State University, East Lansing, Michigan.

Advanced Technology Applications to Eastern Hardwood Utilization—Excerpted from: Progress Report #6, 1993, Dept. of Forestry, Michigan State University, East Lansing, Michigan.

"Laser Cut Furniture Parts", Henry A. Huber, Woodworking & Furniture Digest Nov., 1980, pp. 30–31.

Brochure from FDM (Furniture Design & Manufacturing) "Laser Machining of Wood at Michigan State University", Jul., 1992.

"A Machine Vision System to Examine Hardwood Lumber", Richard W. Conners, Virginia Polytechnic Institute and State University, Blacksburg, VA 24061, Advanced Wood Processing, pp. 51–52.

"Development of a Prototype System to Demonstrate the ALPS Concept: A Modified Vision System Approach", Powsiri Klinkhachorn, West Virginia University, Morgantown, WV Advanced Wood Processing, pp. 49–50.

(List continued on next page.)

*Primary Examiner*—Teresa J. Walberg
*Assistant Examiner*—Gregory L. Mills
*Attorney, Agent, or Firm*—Brooks & Kushman P.C.

[57] ABSTRACT

A method and laser cutting system for cutting a secondary piece from a board is disclosed. A board is provided having a generally planar first and second surfaces separated by a predetermined distance or thickness and having a central plane located midway between the first and second surfaces. First and second lenses are arranged relative to the board with the focal point of the respective first and second lenses disposed intermediate the first and second surfaces of the board. Laser beams from a pair of lasers are propagated through the respective lenses with each laser beam converging at the focal point of its respective lens and cutting the workpiece from its respective surface toward the other surface. Ideally, the focused beams diverge sufficiently along the cutting path such that each laser beam reduces in intensity sufficiently so as not to cause harm to the opposing laser delivering systems or support structure.

20 Claims, 2 Drawing Sheets

OTHER PUBLICATIONS

"Analysis of Combustion Gases Associated With Laser Cutting of Wood", Kali Mukherjee, et al, Michigan State University, East Lansing, MI Advanced Wood Processing, pp. 37–38.

"Yield Comparisons of Conventional and Laser CNC Cutting of Hardwood Dimension Parts from Rough Lumber", Huber, et al, Advanced Wood Processing 1993 Annual Report, pp. 31–60.

"Factors Influencing Laser Cutting of Wood", Barnekov, et al Forest Products Journal vol. 36, No. 1, pp. 55–58, Jan., 1986.

"Gluebond Strength of Laser Cut Wood", McMillin and Huber, Forest Products Journal, vol. 35, No. 1, pp. 23–25, Jan., 1985.

"Economics of Cutting Hardwood Dimension Parts with an Automated System", Huber, et al Forest Products Journal, vol. 39, No. 5, pp. 46–50, May, 1989.

"Economics of Cutting Wood Parts with a Laser Under Optical Image Analyzer Control", Forest Products Journal, vol. 32, No. 3, pp. 16–21, Mar., 1992.

"Prototyping an Automated Lumber Processing System", Klinkhachorn, et al, Forest Products Journal, vol. 43, No. 2, pp. 11–18, Feb., 1993.

"A Comparative Economic Analysis of Automated and Conventional Hardwood Lumber Processing Systems", Manetsch and Huber, Forest Products Journal, vol. 43, No. 1, pp. 35–40, Jan., 1993.

"Overview of Progress and Development of the ALPS", Huber, 2nd International Conference on Automated Lumber Processing.

"Enhancement of the Computer Lumber Grading Program to Support Polygonal Defects", Forest Products Journal, vol. 42, No. 10, pp. 41–46, Oct., 1992.

"An Economic and System Analysis of the Automated Hardwood Lumber Processing System (ALPS)", Manetsch and Huber, Forest Products Journal, vol. 42, No. 3, pp. 51–56 Mar., 1992.

"Industry Standards for Recognition of Marginal Wood Defects", Huber, et al, Forest Products Journal, vol. 40, No. 3, pp. 30–34, Mar., 1990.

"Safety Costs in Hardwood Dimension and Furniture Part Processing From Rough Lumber", Huber and Mukherjee, Advanced Wood Processing, pp. 27–29.

"Yield Comparisons of Conventional and Laser CNC Cutting of Hardwood Dimension Parts from Rough Lumber", Huber and Klinkachorn, Advanced Wood Processing, pp. 30–32.

"Economic Analysis of ALPS, etc." Huber and Manetsch, Advanced Wood Processing, pp. 25–26.

"A Comparison of Two Roughmill Cutting Models", Ruddell, et al, Forest Products Journal, vol. 40, No. 5, pp. 27–29, May, 1990.

"ALPS: Yield Optimization Cutting Program", Klinkhachorn, et al Forest Products Journal, vol. 39, No. 3, pp. 53–56, Mar., 1989.

"Acoustic Emission as a Control Parameter in Red Oak Drying–Final Report", Zalph, et al, Advanced Wood Processing, pp. 59–63.

"Design of a Materials Handling System for the Advanced Lumber Processing System" Weidhaas, et al, Advanced Lumber Processing, pp. 53–54.

"Optimizing Glue–Line Strength of Laser–Cut Hardwoods", Rabiej and Behm, Advanced Lumber Processing, pp. 54–56.

"Laser Power and Feed Speed in Cutting Wood", Mukerjee and Khan, Advanced Wood Processing, pp. 33–36.

"A Study of the Mechanism of Laser Cutting of Wood", Li and Mazumder, Advanced Wood Processing, pp. 39–48.

"Optimizing Glue–Line Strength of Laser–Cut Hardwoods: Phase II", Rabiej and Behm, Advanced Lumber Processing, pp. 57–58.

METHOD AND APPARATUS FOR CUTTING BOARDS USING OPPOSING CONVERGENT LASER BEAMS

TECHNICAL FIELD

The present invention relates to laser cutting of lumber or wooden boards.

BACKGROUND OF THE INVENTION

Concurrently using two or more laser beams to cut a workpiece, such as lumber or wood, is known. For example, U.S. Pat. No. 4,943,700 to Hughes et al. suggests applying a first laser beam "pre-pulse" of a few nanoseconds to a surface of a log to generate a line plasma. Subsequently, a high powered laser beam is directed upon the plasma, self-focusing the laser beam along a plane and producing a hairline cut through the log. It is suggested that the log be cut from opposing sides.

Another example is U.S. Pat. No. 4,689,467 to Inoue which discloses a laser machining apparatus. An auxiliary energy source, such as a secondary laser or plasma generator, is used to condition or preheat a material which is subsequently cut by a powerful primary laser beam. If a workpiece is sufficiently thin, the secondary heating source can be applied to the side opposite the primary laser beam. However, only one laser beam is used to cut or machine a workpiece.

Further, U.S. Pat. No. 4,625,093 to Chryssolouris shows a combination of two laser beams cutting a workpiece. The laser beams are directed along non-coaxial axes to produce intersecting kerfs. The workpiece is moved relative to the laser beams to produce a separate solid removable portion from the workpiece.

However, these systems of cutting wood or workpieces have drawbacks. The high-powered self-focusing laser beam of the '700 patent produces only a very narrow hairline cut with the high powered cutting laser beam remaining substantially non-divergent. While this allegedly allows deep penetration through relatively thick workpieces, the laser beam exiting from the cut workpiece remains focused and powerful. Therefore, the concentrated beam is capable of damaging other downstream structures such as an opposing laser or support structure. Further, the high-powered laser beam is sufficiently powerful that it is recommended that the cutting operation be performed within an evacuated safety enclosure to protect against laser beam ionization of the air and to protect personnel. Moreover, this system is complex in that it requires a first laser beam which creates a plasma upon which a second laser beam is directed so as to be self-focusing. Also, with a laser beam as powerful as the one suggested in the '700 patent, substantial efficiency losses occur due to the high power of lasers involved. Finally, difficulties in over-heating lenses often occur when laser beams of the suggested high power are focussed through such lenses.

The laser cutting system of the '467 patent teaches cutting a workpiece from only a single side. Hence, this system is relatively slow in cutting a workpiece. Also, the system works poorly where the material to be cut has a low thermal conductivity, such as wood.

The laser cutting of the '093 patent uses intersecting, non-coincident laser beams for cutting or slicing thin sections from a large workpiece. This system does not use beams which are coincident to cut through a workpiece from both sides to produce a through-thickness rip and/or cross-cut.

The present invention is intended to overcome the shortcomings of the laser cutting systems described in the above patents.

SUMMARY OF THE INVENTION

It is an object of the present invention to provide a method and laser cutting system in which laser beams are directed through respective lenses converging at focal points located between two parallel surfaces of a wooden board to be cut. The laser beams then exit the board and diverge sufficiently to reduce their intensity thereby preventing damage downstream of the board to components of the laser cutting system.

It is another object to maximize the speed at which a board can be cut to produce a through-thickness rip or cross-cut using a laser beam cutting system of a given power.

It is yet another object to provide a method and system for laser cutting using a pair of opposing laser beams to produce a pair of generally co-planar kerfs extending from opposite parallel surfaces of a board wherein the overall combined kerf width is reduced as compared to using a conventional single laser beam for cutting.

Still a further object is to cut through a board from opposing sides to reduce the depth of the pathway of smoke and debris each laser beam must pass through.

It is an additional object to provide an apparatus and method wherein boards of a predetermined thickness are cut using a pair of laser beams and converging lenses of differing focal lengths or cone angles to optimize cutting speed.

A method and a laser cutting system for laser cutting a secondary piece from a primary wooden board is disclosed. The primary board is provided having generally planar first and second surfaces separated by a predetermined distance and having a central plane located midway between the planar first and second surfaces. A first focusing lens is located relative to the primary board with the focal point of the first lens locating intermediate the first and second surfaces of the workpiece. A second focusing lens is arranged on the opposite side of the primary board with the focal point of the second lens also locating intermediate the first and second surfaces of the primary board.

A first laser beam is focused through the first lens to converge the first laser beam upon the first focal point and then diverge the first laser beam with the first laser beam cutting the primary board from the first surface toward the second surface. A second laser beam is applied to the second lens to converge the second laser beam upon the second focal point and then diverge the second laser beam with the second laser beam cutting the workpiece from the second surface toward the first surface. The first and second laser beams, after passing through the lenses, are generally coaxially aligned with respect to one another to produce adjoining congruent kerfs through the thickness of the primary board to form a single cut through the board. The primary board and laser beams are moved relative to one another to create an elongate cut pathway resulting in a secondary piece being cut from the primary board.

The focal lengths of the first and second lenses may be asymmetric or not equal. Likewise, differing cone angles on the converging laser beams are desirable. Further, preferably, the laser beam with the smaller cone angle produces a deeper kerf than the opposing laser beam. Tests have shown an advantageous cutting speed can be attained by using asymmetric cone angles or focal lengths.

BRIEF DESCRIPTION OF THE DRAWINGS

These and other features, objects, and advantages of the present invention will become readily apparent from the following description, pending claims, and accompanying sheets of drawings where:

BEST MODE FOR CARRYING OUT THE INVENTION

Figure 1:
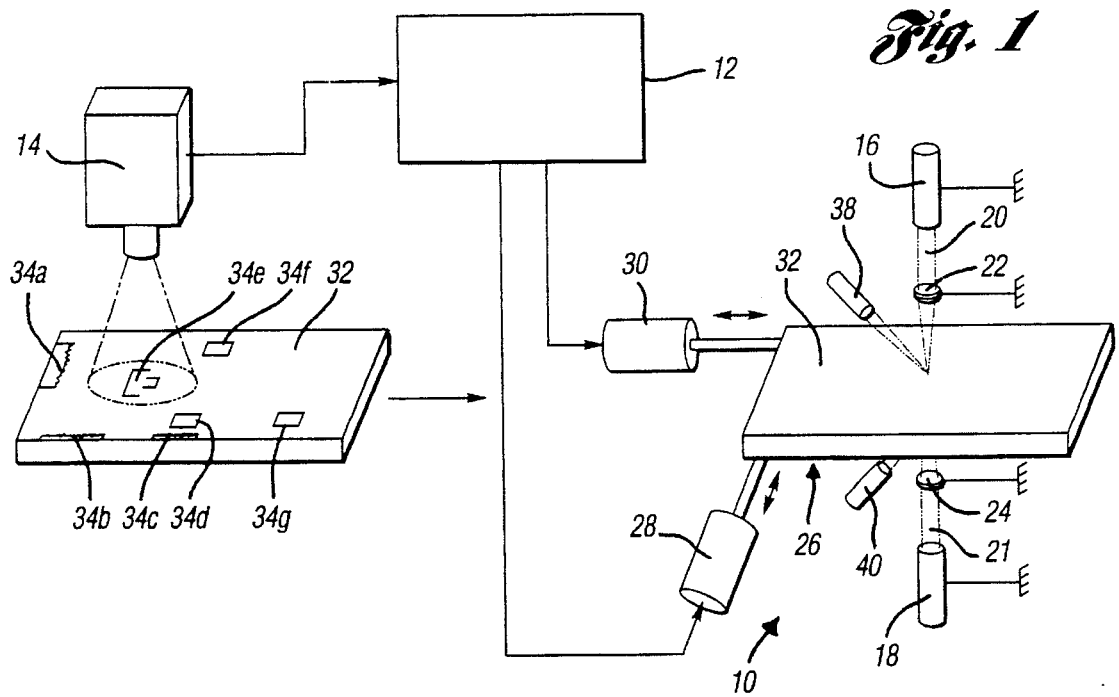
FIG. 1 is an overall schematic view of a laser cutting system for boards made in accordance with the present invention.

A laser cutting system 10 for boards, made in accordance with the present invention, is shown in FIG. 1. System 10 includes a computer 12, a camera 14, lasers 16 and 18, a pair of focusing lenses 22 and 24 and a movable support 26 for moving a workpiece, such as a one-inch thick wood board 32, relative to lenses 22 and 24. Lasers 16 and 18 produce laser beams 20 and 21, respectively. Motors 28 and 30 are used translate support 26 and board 32 along orthogonal axes as indicated by the arrows. This combination of translations can be used to make curved cuts as well as straight cuts. Support 26 is a schematically illustrated movable support such as a conventional X-Y table or frame for holding the periphery of board 32.

In the preferred embodiments, lasers 16 and 18 are $CO_2$ continuously working lasers producing light on the order of 10.6 μm in wavelength. Other commercially available lasers such as Nd-YAG or Eximer may also be used. Alternatively, a single laser could be used with a beam splitter and mirrors to produce laser beams 20 and 21. However, by using two separate lasers 16 and 18 lower powered lasers can be used. The laser beams may be continuously applied. Alternatively, delays between 5 to 10 milliseconds may be used between turning on and off first and second laser 16 and 18.

In the preferred embodiments, each of laser beams 20 and 21 has about 1300 watts of power. Of course, laser beams of other strengths could also be used. Lasers producing more powerful beams are generally less energy efficient. Further, using more powerful laser beams can result in overheating of the lenses due to excessive energy absorption.

Lenses 22 and 24 in the preferred embodiment are respective $Z_N S_E$ (zinc selenide) transmittive lenses available from Laser Machining of Somerset, Wis. Alternatively, equivalent refelective mirrors could be used to focus the laser beams rather than the transmittive lenses. The cone angle (α) is calculated by the formula:

$$2\alpha = 90° - \gamma°, \text{ where } \gamma = \frac{2F_L}{D_{beam}} \text{ radians;}$$

Lens 22 has a focal length $F_L$ of 7.5 inches and an outer diameter of 2.0 inches. Lens 24 has a 10 inch focal length and an outer diameter of 2.0". Ideally, the range of focal lengths could vary from 3–12 inches or more. Preferably, the cone angles of α range from 4° to 8°.

Wooden plank or board 30 typically contains defects 34a–g such as cracks or knots which are undesirable in certain constructions such as furniture. Camera 14 scans board 32 noting the size and location of the defects 34a–g. This information is conveyed to computer 12. Computer 12 calculates the size of individual defect free pieces 36a–f which can be cut from board 32 utilizing an optimization algorithm. In this case, the selection of particular sizes of pieces 36a–f is dependent upon the size and location of the defects 34 as well as the particular need for pieces of certain sizes. General optimization algorithms are well known as is described in a paper entitled, ALPS (Automated Lumber Processing System):yield optimization cutting program, in FOREST PRODUCT JOURNAL, Vol. 39, No. 3., March, 1989.

Rather than using an integral board 30, a composite board made from individual pieces is glued together. Then, the composite board can be scanned for defects. If properly glued together, the glue joints will not act as defects nor are these joints recognized as being defects. This method replaces the conventional method of cutting clear or defect-free portions from a board and then gluing the defect-free pieces together.

Blower or vacuum units 38 and 40 are disposed on either side of board 32 to evacuate smoke and debris as cutting occurs to reduce degradation of laser beam intensity due to light scattering from the smoke and debris produced in the cutting or ablation operation. By evacuating smoke and debris from both sides of board 30, cutting speed is enhanced over using a single blower unit.

Figure 2:
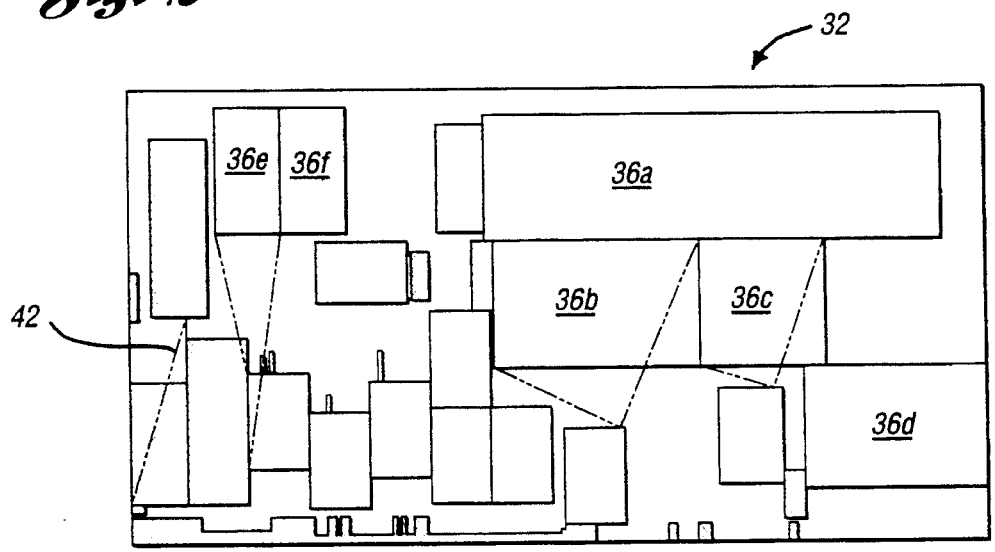
FIG. 2 is a schematic view of secondary pieces to be cut from a primary board, defects noted on the primary board, and an optimized cutting path to be followed.

FIG. 2 illustrates a sample output, not to scale, calculated by computer 12 of the defect free pieces 36a–f and defects 34. Also, an optimized cutting path 42 is calculated which requires the minimum travel, and hence, the least required cutting, by laser cutting system 10. Computer 12 then turns lasers 16 and 18 on and off producing laser beams 20 and 21 as needed to create cutting path 42.

Figure 3A:
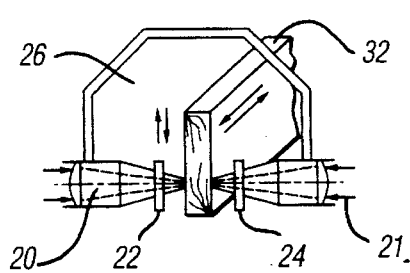
FIG. 3a and 3b are schematic views respectively showing a board supported upon a movable mount for relative movement with respect to a pair of stationary laser beams and translatable lasers and lenses which are movable relative to a fixed board.
Figure 3B:
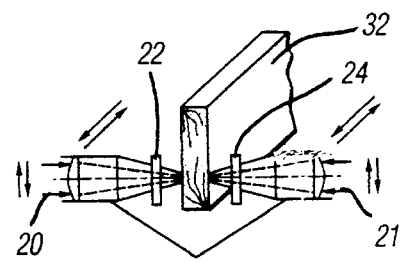

Lasers 16 and 18 and lenses 22 and 24 are mounted to fixed supports, schematically shown in FIGS. 1. Movable support 26 moves the board 32 relative to lenses 22 and 24 and laser beams 20 and 21. Alternatively, board 30 could be stationary with lasers 16 and 18 and lenses 22 and 24 being mounted on movable supports whose movement is controlled by computer 12 to achieve the desired cutting path 42 and resultant cut pieces 36a–f. These alternative embodiments are schematically illustrated in FIGS. 3a and 3b with arrows indicating the movement of components.

Figure 4:
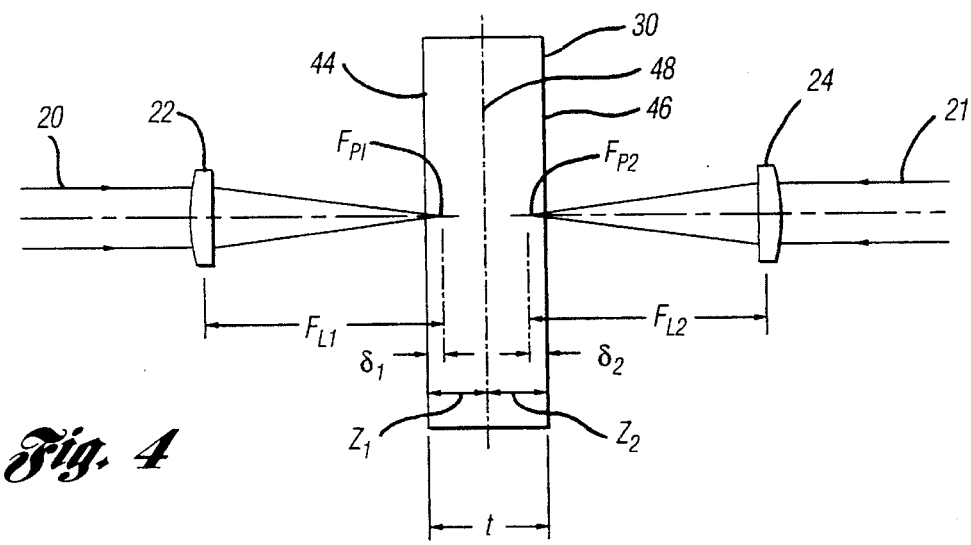
FIG. 4 is a schematic view showing opposing convergent laser beams cutting through a board utilizing lenses having approximately equal focal lengths and cone angles.
Figure 5:
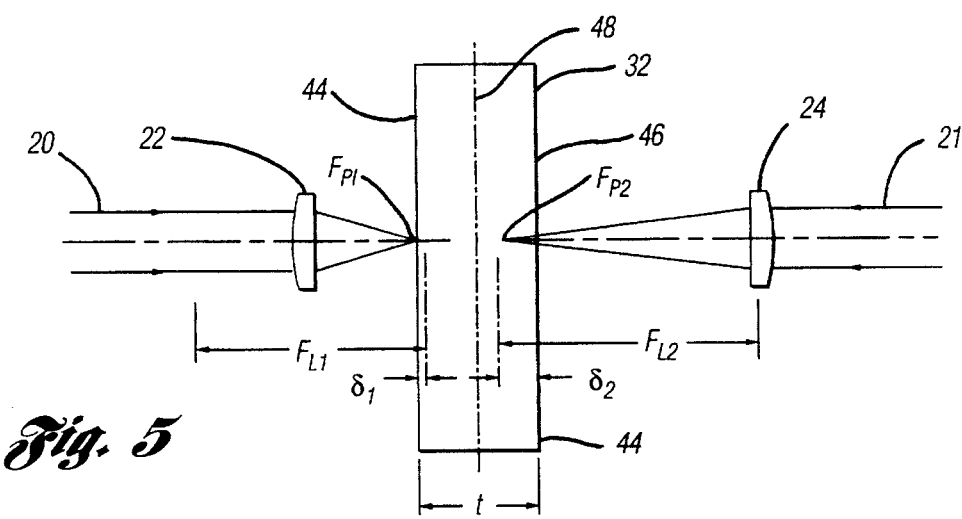
FIG. 5 is a schematic view showing opposing convergent laser beams cutting through a board utilizing lenses having differing focal lengths and cone angles.

Alternative embodiments of the placement of lenses 22 and 24 relative to board 32 is shown in FIGS. 4 and 5. Ideally, lenses 22 and 24 have a focal lengths $F_{L1}$ and $F_{L2}$ ranging between 3–12 inches. The preferred range of cone angles is between 4°–8°. In the embodiment of FIG. 4, lenses 22 and 24 are identical and are symmetric about board 32 with 7.5 inch focal lengths and cone angles of between 4°–8°. In FIG. 5, lenses 22 and 24 have differing focal lengths, 7.5 and 10 inches respectively, with cone angles also between 4°–8°. In either embodiment, beams 20 and 21 are preferably substantially coaxially aligned. The coaxially alignment assists in making sharp curved cuts.

Looking now to FIG. 4, board 32 has two generally planar surfaces 44 and 46 separated by a distance or thickness t. A central plane 48 lies midway between planar surfaces 44 and 46. Converging laser beams 20 and 21 arrive at focal points $F_{p1}$ and $F_{p2}$ located between central plane 46 and the respective adjacent planar surfaces 44 and 46 in zones $Z_1$ and $Z_2$.

Figure 6A:
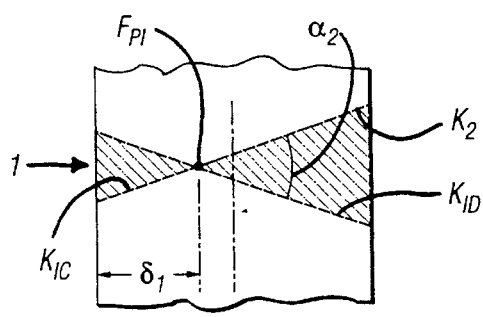
FIGS. 6a and 6b are cross-sectional views showing kerfs respectively produced by a single laser beam and by a pair of opposing convergent laser beams.
Figure 6B:
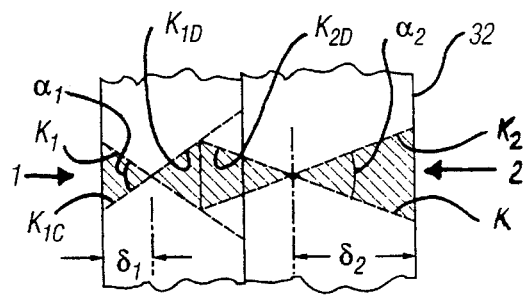

FIGS. 6a and 6b show respective kerfs produced by a conventional single laser beam cutting system and that produced by a pair of non-symmetric opposing laser beams of the present invention. The kerfs are not to scale, but are for illustration purposes only.

In FIG. 6a, a single beam, passing in the direction of the arrow first creates a kerf portion $K_{1C}$ as the beam converges and a kerf portion $K_{1D}$ as the beam diverges to cut through the board producing an overall kerf $K_1$. $\delta_1$, or the depth of $F_{p1}$, is ⅓t for the single beam cutting.

FIG. 6b shows kerfs $K_1$ and $K_2$ produced by opposing laser beams 20 and 21 propagating in the direction of arrows 1 and 2 respectively. Kerf $K_1$ is produced by beam 20 as it converges and diverges to produce kerf portions $K_{1C}$ and $K_{1D}$. Similarly, kerf $K_2$ is created by beam 21 with kerf portions $K_{2C}$ and $K_{2D}$. Kerfs $K_1$ and $K_2$ adjoin one another to produce a through cut in board 32.

The beams travelling along arrow 1 of FIG. 6a and arrow 2 of FIG. 6b have generally equal cone angles. The beam travelling along arrow 1 of FIG. 6b, or beam 20, has a larger cone angle, i.e. $\alpha_1 > \alpha_2$. Note that while kerfs $K_1$ and $K_2$ are only illustrative, and are in fact much more contoured and non-planar, FIGS. 6a and 6b do suggest that using opposing beams, as compared to using a single beam to cut boards, will result in a smaller or narrower kerf being cut.

The focal points $F_{p1}$ and $F_{p2}$ of each of lenses 22 and 24 in FIGS. 4 and 5 ideally are located between the central plane 48 and the their respective proximate or adjacent planar surface 44 or 46. The position chosen within these limits will affect the quality of the cut and size of kerf, but not generally the speed of cutting. Most preferably, with the symmetric 7.5" focal length for each of lenses 22 and 24, the focal points $F_{p1}$ and $F_{p2}$ will be located a distance $\delta_1 = \delta_2 = ⅓t$ to ¼t inboard from the respective surfaces 44 and 46. However, $\delta_1 = \delta_2$ can range from 0t to ½t. With asymmetric lenses, i.e., 7.5" and 10", the focal point $F_{p1}$ of the 7.5" lens is also ideally $\delta_1 = ⅙t$ to ¼t inboard from surface 44 and focal point $F_{p2}$ of the 10" lens is preferably $\delta_2 = ⅙t$ to ¼t inboard from surface 46. The overall range of $\delta_1$ and $\delta_2$ may be from 0 to ½t and 0 to ½t, respectively. In actual tests conducted, $\delta_1 = \delta_2 = ⅓t$.

The tests were run under various conditions to ascertain optimal combinations of power, speed, and focal length. The results are displayed below.

TABLE I

CUTTING SPEED VERSUS POWER

SPEED OF CUTTING (Inches Per Minute)

| | Conventional Single Beam | | | Double Beam Laser Power/Watts | | | | | |
|---|---|---|---|---|---|---|---|---|---|
| Board Thickness | Power/Watts | | | 2 × 600 | | 2 × 900 | | 2 × 1300 | |
| Oak Kiln Dried 7% | 1200 | 1800 | 2600 | Symm. | Asymm. | Symm. | Asymm. | Symm. | Asymm. |
| ½" | 130 | 220 | 300 | 180 | 200 | 300 | 330 | 400 | 440 |
| ¾" | 60 | 100 | 180 | 80 | 100 | 140 | 170 | 240 | 270 |
| 1" | 30 | 50 | 110 | 40 | 60 | 70 | 90 | 160 | 190 |

In the test, oak boards dried to 7% moisture, of varying thicknesses, i.e. ½", ¾" and 1", were cut. Lasers of varying power, 1200, 1800 and 2600 watts, respectively, were used to cut boards. First, a single laser beam was applied to only one side of the board in a conventional single laser beam cutting system. The focal point of the laser beam was $\delta_1 = ⅓t$, as shown in FIG. 6a. Next, two opposing laser beams, each having half the power of a corresponding single laser beam, was applied to lenses 22 and 24 with the symmetric focal length of 7.5 inches. Finally, two opposing laser beams, again each having half the power of a corresponding single beam, were used with asymmetric lenses of 7.5" and 10" focal lengths. The focal points $F_{p1}$ and $F_{p2}$ of $\delta_1 = ⅓t$ and $\delta_2 = ⅓t$ were used. A determination was made as to the maximum speed at which the laser beams could cut the boards. Of course, the more powerful the beam and the thinner the board, the faster the permissible cutting speed.

The results show that for a given power laser, using opposing laser beams provides an increased cutting speed ever using a single beam of the same total power. Somewhat surprisingly, using the asymmetric lens configuration of FIG. 5 resulted in increased cutting speed over using the symmetric lens arrangement of FIG. 4.

For example, with a 1" thick oak board and two opposing 1300 watt laser beams, a speed of 160 inches per minute was achieved with the symmetric 7.5" lenses. However, using asymmetric lenses, i.e. 7.5" and 10" focal lengths, a speed of 190 inches per minute was attained. Cutting the board from one side using only a single 2600 watt laser beam achieved only a 110 inch per minute cutting speed.

The present invention offers significant advances over prior laser board cutting systems. Cutting boards using opposing, convergent laser beams provide for greater cutting speed utilizing a given power as compared to conventional single laser beam cutting. Smoke and debris can be evacuated from both sides of a board being cut. The distance or depth each individual laser beam must cut through is reduced. Also, the overall kerf size and width can be reduced as compared to using a single beam. This results in a greater yield of uncut board material after the laser cutting has been performed.

It is hypothesized that using asymmetrical cone angles or focal lengths, which result in different cutting depths, may enhance cutting speed by providing an "exhaust port" on the shorter cut depth side for the debris produced by the laser beam creating the deeper cut. In contrast, with two balanced depth cuts, there is no driving imbalance to create a self-evacuating kerf. In any event, test results have shown that using asymmetric cone angles or focal lengths can lead to enhanced cutting speeds.

While the foregoing specification of this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for laser cutting a workpiece having generally opposing first and second surfaces, the method comprising:

providing a first lens having a first focal length;

providing a second lens having a second focal length which approximately differs from the first focal length by at least 10%;

applying a first laser beam to the first lens to converge the first laser beam at a first focal point proximate the first surface and to diverge the first laser beam thereafter so that the first laser beam cuts the workpiece from the first surface toward the second surface to provide a first cut;

applying a second laser beam to the second lens to converge the second laser beam at a second focal point proximate the second surface and to diverge the second laser beam thereafter so that the second laser beam cuts the workpiece from the second surface toward the first surface to provide a second cut, the first and second cuts joining each other to cut the workpiece substantially through; and moving the workpiece relative to the first and second laser beams.

2. The method of claim 1 wherein the first and second laser beams are generated by first and second laser sources, respectively, the first and second laser sources each having an approximate output power of at least 600 watts.

3. The method of claim 1 wherein the first and second laser beams are generated by a single laser source having an approximate output power of at least 1200 watts.

4. The method of claim 1 wherein the workpiece has an approximate thickness between the first and second surfaces of at least 0.5 inches.

5. The method of claim 1 wherein the first and second lenses are oriented relative to the workpiece such that debris produced by the laser cutting of the workpiece fails to interfere with the first and second lenses.

6. The method of claim 1 wherein the workpiece comprises a material having a relatively low energy absorption property.

7. The method of claim 1 further comprising applying a stream of air to at least one of the first and second surfaces to direct in a predetermined direction debris and smoke produced by the laser cutting of the workpiece.

8. The method of claim 1 wherein the workpiece has a central plane located approximately midway between the first and second surfaces, and wherein the first focal point is located between the first surface and the central plane, and the second focal point is located between the second surface and the central plane.

9. The method of claim 1 wherein the steps of applying a first laser beam to the first lens and applying a second laser beam to the second lens are simultaneous.

10. The method of claim 1 wherein the first and second laser beams are substantially coaxial.

11. An apparatus for laser cutting a workpiece having generally opposing first and second surfaces, the apparatus comprising:

a first lens having a first focal length;

a second lens having a second focal length which approximately differs from the first focal length by at least 10%;

laser source means for
   a) applying a first laser beam to the first lens to converge the first laser beam at a first focal point proximate the first surface and to diverge the first laser beam thereafter so that the first laser beam cuts the workpiece from the first surface toward the second surface to provide a first cut, and
   b) applying a second laser beam to the second lens to converge the second laser beam at a second focal point proximate the second surface and to diverge the second laser beam thereafter so that the second laser beam cuts the workpiece from the second surface toward the first surface to provide a second cut, the first and second cuts joining each other to cut the workpiece substantially through; and means for moving the workpiece relative to the first and second laser beams.

12. The apparatus of claim 11 wherein the laser source means comprises first and second laser beam generators, each generator having an approximate output power of at least 600 watts.

13. The apparatus of claim 11 wherein the laser source means has an approximate output power of at least 1200 watts.

14. The apparatus of claim 11 wherein the workpiece has an approximate thickness between the first and second surfaces of at least 0.5 inches.

15. The apparatus of claim 11 wherein the first and second lenses are oriented relative to the workpiece such that debris produced by the laser cutting of the workpiece fails to interfere with the first and second lenses.

16. The apparatus of claim 11 wherein the workpiece comprises a material having a relatively low energy absorption property.

17. The apparatus of claim 16 further comprising a blower for applying a stream of air to at least one of the first and second surfaces to direct debris and smoke produced by the laser cutting of the workpiece in a predetermined direction.

18. The apparatus of claim 11 wherein the workpiece has a central plane located approximately midway between the first and second surfaces, and wherein the first focal point is located between the first surface and the central plane, and the second focal point is located between the second surface and the central plane.

19. The apparatus of claim 11 wherein the laser source means applies the first and second laser beams simultaneously.

20. The apparatus of claim 11 wherein the first and second laser beams are substantially coaxial.

* * * * *